United States Patent
Blach

(10) Patent No.: US 8,562,203 B2
(45) Date of Patent: Oct. 22, 2013

(54) EXTRUDER

(75) Inventor: Josef A. Blach, Lauffen (DE)

(73) Assignee: Blach Verwaltungs GmbH, Lauffen a.N. (DE)

(*) Notice: Subject to any disclaimer, the term of this patent is extended or adjusted under 35 U.S.C. 154(b) by 1331 days.

(21) Appl. No.: 11/665,733

(22) PCT Filed: Sep. 22, 2005

(86) PCT No.: PCT/EP2005/010233
§ 371 (c)(1),
(2), (4) Date: Mar. 7, 2008

(87) PCT Pub. No.: WO2006/042613
PCT Pub. Date: Apr. 27, 2006

(65) Prior Publication Data
US 2008/0259717 A1    Oct. 23, 2008

(30) Foreign Application Priority Data

Oct. 20, 2004  (DE) .......................... 10 2004 051 203

(51) Int. Cl.
*B01F 7/00* (2006.01)
*B29B 7/00* (2006.01)

(52) U.S. Cl.
USPC ............................................. 366/75; 366/88

(58) Field of Classification Search
USPC ............................. 366/88, 75, 76.3, 76.4, 79
See application file for complete search history.

(56) References Cited

U.S. PATENT DOCUMENTS

| 3,742,093 A | 6/1973 | Skidmore |
| 3,917,507 A * | 11/1975 | Skidmore ....................... 159/2.2 |
| 4,117,548 A | 9/1978 | Craig |
| 5,283,021 A | 2/1994 | Shih |
| 5,836,682 A | 11/1998 | Blach |
| 6,422,732 B1 | 7/2002 | Maris |
| 2004/0072920 A1 | 4/2004 | Goedicke et al. |

FOREIGN PATENT DOCUMENTS

EP    0 788 867 B1    7/1999

OTHER PUBLICATIONS

International Search Report dated Jan. 30, 2006.

* cited by examiner

*Primary Examiner* — Tony G Soohoo
*Assistant Examiner* — Anshu Bhatia
(74) *Attorney, Agent, or Firm* — Miller Canfield Paddock and Stone; Mark L. Maki

(57) ABSTRACT

An extruder comprises a displacement part with a housing, inside of which at least one screw shaft is housed and which is provided, at one end, with a material entry opening for the material to be processed and, at the other end, with a material outlet opening for the processed material, and with an intermediate opening between the material entry opening and the material outlet opening for discharging gas from the displacement part. A material retaining device is connected to said intermediate opening and has at least one screw shaft inside an intermediate housing. This screw shaft extends from the intermediate opening to a gas discharge opening in the intermediate housing and conveys material entering the intermediate housing back into the displacement part. To this end, the screw section of the screw shaft facing the displacement part has a direction of thread that returns into the displacement part, and the screw section of the screw shaft facing away from the displacement part has an opposite direction of thread.

14 Claims, 5 Drawing Sheets

EXTRUDER

FIELD OF INVENTION

This invention relates to an extruder having a screw shaft and an opening for the escape of gas from a process section of the extruder.

BACKGROUND OF THE INVENTION

Extruders are often used for conveying and processing substances. To separate gases during processing of plastics in an extruder, a gas outlet opening is provided in the housing of the process section of the extruder in which the solid or viscous plastic is processed. To prevent plastic from being discharged from the process section through said opening, the material retaining device is provided, also known as the "stuffer". It has one or two screw shafts whose screw has a direction of thread over the total length by which it forces plastic entering said opening back into the process section, while gas passing through the screw can be drawn off.

As has turned out, however, plastic extruded with an extruder having such a retaining device shows a great number of black specks, which are extremely disturbing in particular in products made of transparent plastic, such as PET.

The problem of the invention is to provide an extruder having such a retaining device at the gas outlet opening which largely eliminates the formation of black specks.

This is obtained according to the invention by the extruder characterized in the claims. Advantageous embodiments of the invention are rendered in the subclaims.

As has turned out, the formation of black specks is due to the fact that the screw shaft and the inside wall of the retaining device have the same high temperature as the process section. In the known extruder, plastic residues adhering to the hot screw shaft or inside wall of the retaining device can thus decompose. Since the decomposition depends on the duration at which a plastic residue adheres to the hot metal surface of the screw or the inside wall of the retaining device, a plastic residue transported by the screw over its total length as far as the gas outlet opening in the intermediate housing of the material retaining device will naturally undergo particularly great decomposition. The solid products of decomposition are then, in the known extruder, conveyed by the material retaining device screw backfeeding over its full length back to the process section and mixed with the plastic in the process section to form the black specks in the extruded plastic product.

Starting out from this finding, the invention is based on giving only the portion of the material retaining device screw adjacent the process section a backfeeding design. The plastic is in contact with said portion only a short time. Moreover, in said portion the material is continually replaced on the hot screw surface and inside wall as in the process section. This prevents decomposition of the plastic and thus a formation of black specks in said portion.

In contrast, plastic residues passing through said portion of the material retaining device reach the screw portion with the opposite pitch according to the invention, i.e. they are no longer conveyed back to the process section but away therefrom and are thus separated from the process section. In this area they are thus exposed to the hot temperature of the screw and the inside wall of the intermediate housing for some time and are decomposed. The solid black decomposition specks can be drawn off together with the separated gas through the gas outlet opening in the intermediate housing, or an additional opening on the underside of the intermediate housing can be provided for the residues to drop through.

The process section of the inventive extruder can have only one screw shaft. However, there can also be provided two or more, in particular eight or more, axially parallel screw elements which can closely intermesh, the screw shafts being received and guided by axially parallel concave circular segments on the inside wall of the extruder housing. A plurality of said screw shafts can be disposed in a plane or form a ring, as described in EP 0 788 867 B1.

The material retaining device can likewise have only one screw shaft. However, it is preferable to provide two or more axially parallel screw shafts whose screws closely intermesh and which are in each case received and guided by axially parallel concave circular segments in the inside wall of the extruder housing.

It is possible to use corotating or counterrotating screws in the material retaining device. Since counterrotating screw shafts form an axially closed system unlike the axially open system of corotating screw shafts, i.e. counterrotating screw shafts cause forced conveyance, counterrotating screw shafts are generally preferred in the material retaining device since they prevent the occurrence of black specks even more rigorously.

Moreover, the self-cleaning of counterrotating screws is fundamentally better than of corotating screws, since with counterrotating screws their crests touch each other and lie against the inside wall of the intermediate housing, while corotating screws have a clearance between the crests of the screws and the inside wall. Wear can be combated by hardening the screws and the intermediate housing.

With counterrotating screw shafts it is furthermore possible to completely omit drive gears on the screw shafts if need be, since only one shaft needs to be driven which drives the other shaft by form-fitting engagement of the screws. This substantially simplifies the installation, assembly and maintenance of the screw shafts.

The screw shafts of the material retaining device are preferably formed in one piece with their drive, for example a drive gear. There is thus no coupling between screw shaft and drive gear as provided according to the prior art. The split gear box driving the screw shafts can thus be built small, light and economically.

So that no toxic gases can escape from the extruder unchecked, but also to prevent air from passing into the extruder, the intermediate housing with the material retaining device must be connected vacuumtight to the extruder housing and to the split gear box, whereby the split gear box must in turn be of vacuumtight form.

Since the split gear box contains bearings, seals and similar parts that can be damaged at the high temperature of the process section of for example approx. 250° C., it is advantageous to dispose heat insulating means, for example an insulating plate, between the intermediate housing with the material retaining device and the split gear box.

The inventive extruder is particularly suitable for processing plastics, such as PVC, PE and others. Since the formation of black specks is largely prevented, it is particularly suitable for producing transparent plastic products, in particular water-clear products, for example made of PET.

BRIEF DESCRIPTION OF THE DRAWINGS

Embodiments of the inventive extruder will hereinafter be explained more closely with reference to the enclosed drawing. The figures are described as follows, each showing a perspective view.

DETAILED DESCRIPTION

Figure 1:
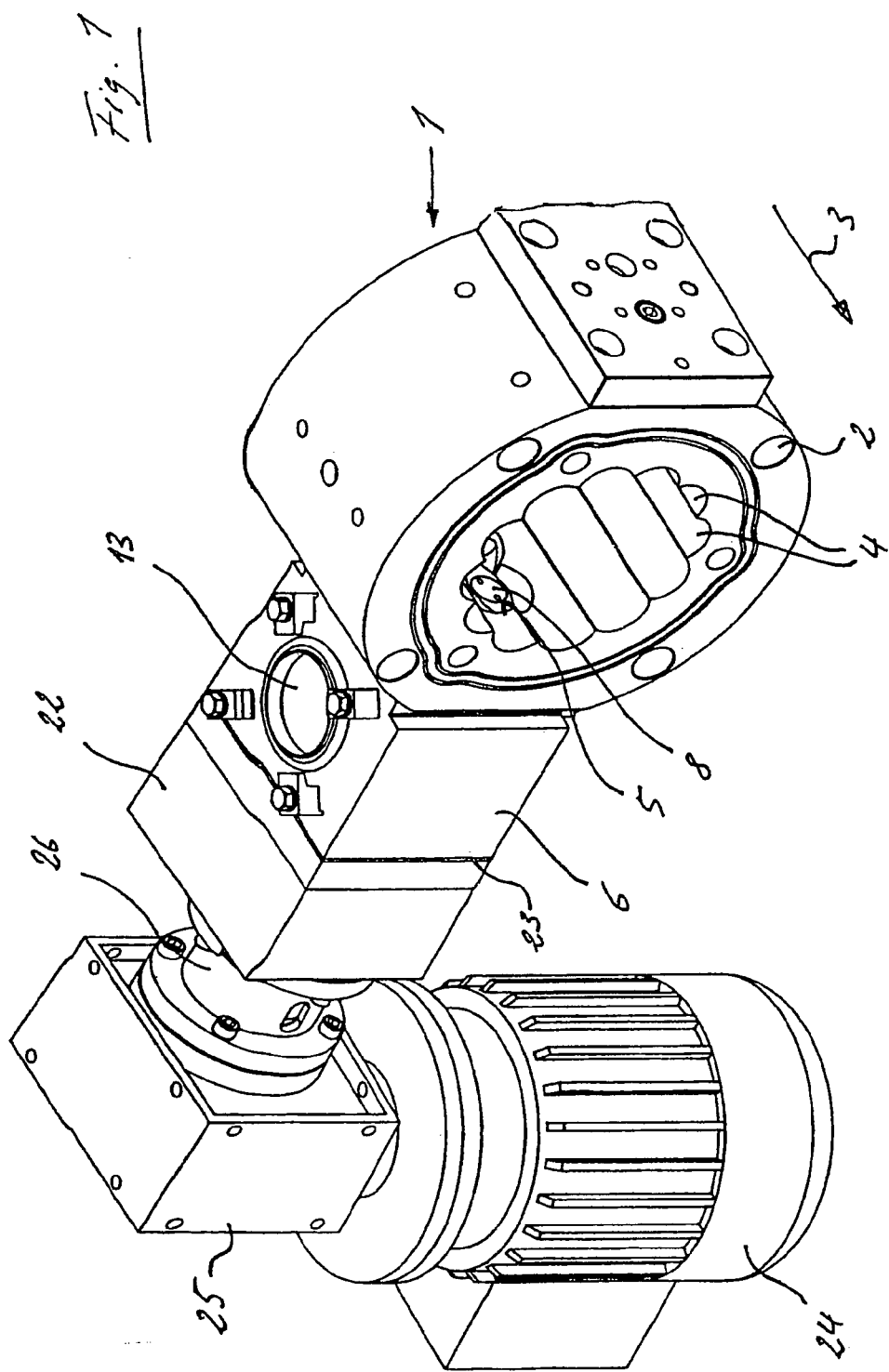
FIG. 1 a segment of the process section of the extruder with the material retaining device connected thereto.

According to FIG. 1, only a housing segment 1 of the process section of the extruder is shown. The process section consists of a plurality of such juxtaposed housing segments which can be clamped together by pull rods (not shown) guided through the bores 2 in the housing segment 1.

The conveying direction of the process section is shown by the arrow 3. On the upstream conveying side of the segment 1 the housing segment (not shown) with the material inlet opening of the extruder is disposed, and on the downstream conveying side the housing segment (not shown) with the material outlet opening thereof.

The process section is formed as a ring extruder, as described e.g. in EP 0 788 867 B1. That is, extending axially through the housing segment 1 and the other housing segments (not shown) of the process section is an inside core (not shown). Between the inside core and the housing segments there is an annular space with axially parallel rotatable shafts extending therein, disposed along a circle at equal central-angle distance, each of which carries a number of tandem-arranged screw and other processing elements with which adjacent shafts closely intermesh, the inside core on the interior side of said space and, as shown in FIG. 1, the inside wall of the housing segments 1 being provided with channel-shaped axially parallel depressions 4 in which the particular shaft with its processing elements is received and guided.

The housing segment 1 shown in FIG. 1, disposed between the material inlet opening and the material outlet opening of the process section, is provided with an intermediate opening 5 for removing gases from the plastic being processed in the process section.

Figure 2:
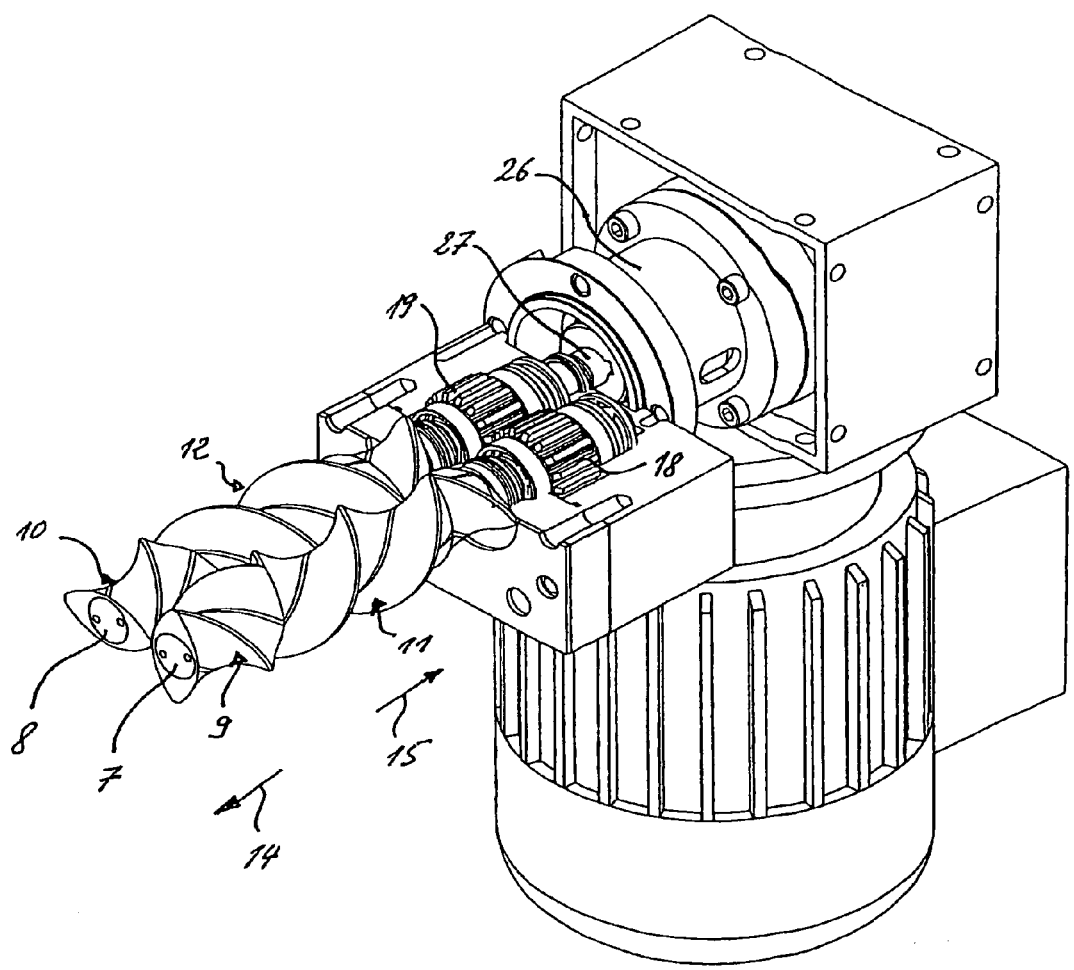
FIG. 2 a material retaining device with two counterrotating screw shafts, the housing of the material retaining device being whole and a part of the housing of the split gear box being omitted.

For this purpose, the segment 1 has connected thereto an intermediate housing 6 having two axially parallel screw shafts 7, 8 disposed therein, which are shown in FIG. 2 and extend perpendicular to the longitudinal axis of the process section. Each screw shaft 7, 8 has a short screw element 9, 10 facing the process section, and a long screw element 11, 12 facing away from the process section. The screw elements 9, 11 and 10, 12 of the two shafts 7, 8 intermesh closely, the intermediate housing 6 being provided on the inside wall with axially parallel channel-shaped depressions (not shown) which receive the screw elements 9 to 12 and thus guide the screw shafts 7, 8. The screw elements 9 to 12 are disposed rotationally fast on the screw shafts, e.g. by a splining.

The screw shafts 7, 8 extend with their screw elements 9 to 12 from the intermediate opening 5 in the housing segment 1 of the process section as far as the gas outlet opening 13 in the intermediate housing 6 through which gases separated from the plastic in the process section are drawn off.

The screw elements 9, 10 have a direction of thread so as to convey plastic material penetrating from the process section into the intermediate housing 6 back to the process section in the direction of the arrow 14. This device is accordingly called the material retaining device. In contrast, the screws 11, 12 have the opposite direction of thread, thereby causing plastic material reaching the screw elements 11, 12 via the screw elements 9, 10 to be conveyed away from the process section according to the arrow 15. Due to the high temperature of the surface of the screw elements 9 to 12 and the inside wall of the intermediate housing 6, plastic material adhering to these surfaces for some time is decomposed. While plastic is continually replaced in the area of the backfeeding screw elements 9, 10 and thus decomposition is prevented, plastic residues reaching the feeding elements 11, 12 are decomposed. The decomposed plastic residues can either be drawn off through the gas outlet opening 13, or a further opening (not shown) can be provided on the underside of the intermediate housing 6 in the area facing away from the process section, through which the plastic residues can be removed.

In the embodiment according to FIG. 2, the screw element 9 on the screw shaft 7 is of right-hand form and the screw element 11 of left-hand form, while on the screw shaft 8 the screw element 10 is of left-hand form and the screw element 12 of right-hand form.

Figure 3:
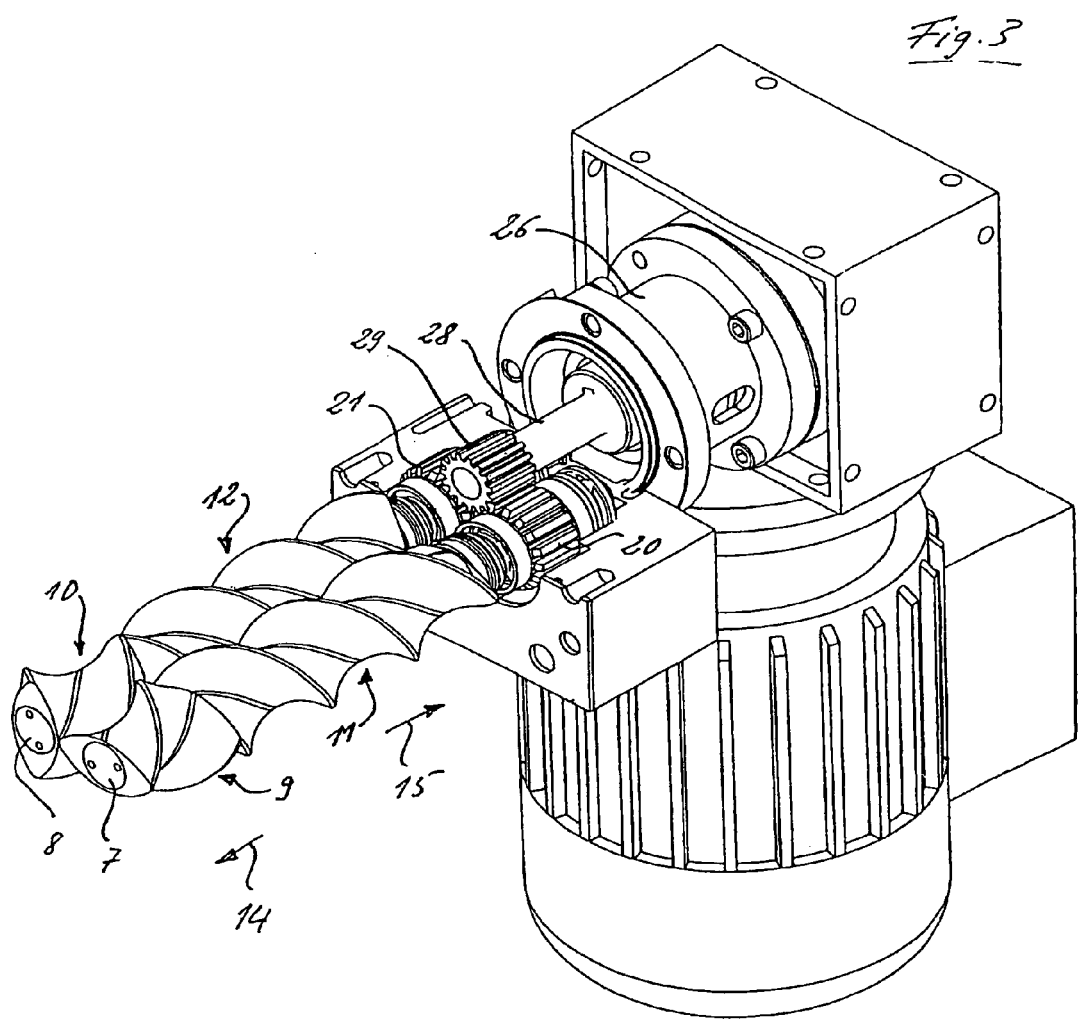
FIG. 3 a view corresponding to FIG. 2, but of a material retaining device having two corotating screw shafts.

While FIG. 2 shows counterrotating screw shafts 7, 8, the screw shafts 7, 8 in FIG. 3 are driven in corotating fashion.

Both the screw shafts 7, 8 according to FIG. 2 and the screw shafts 7, 8 according to FIG. 3 can be formed in one piece with their drive gears 18, 19; 20, 21.

Figure 4:
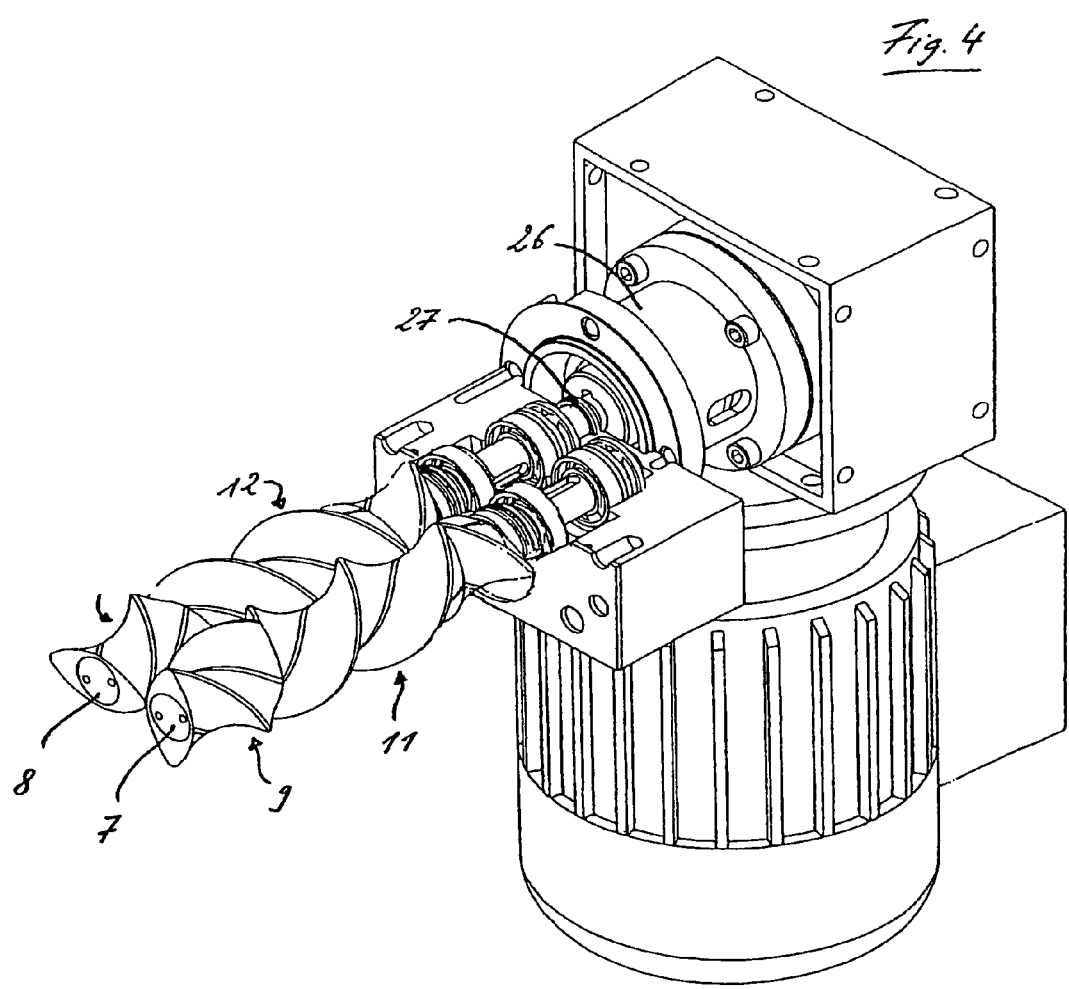
FIG. 4 a view corresponding to FIG. 2, but of screw shafts without drive gears.

As shown in FIG. 4, if there are two counterrotating screw shafts 7, 8 a gear drive can be completely omitted, since the driven screw shaft 8 drives the shaft 7 by the screw elements 10, 12 of the former engaging the screw elements 9, 11 of the latter. This means that in the embodiment according to FIG. 4 it is only necessary to mount the shafts 7, 8 in the split gear box 22.

Figure 5:
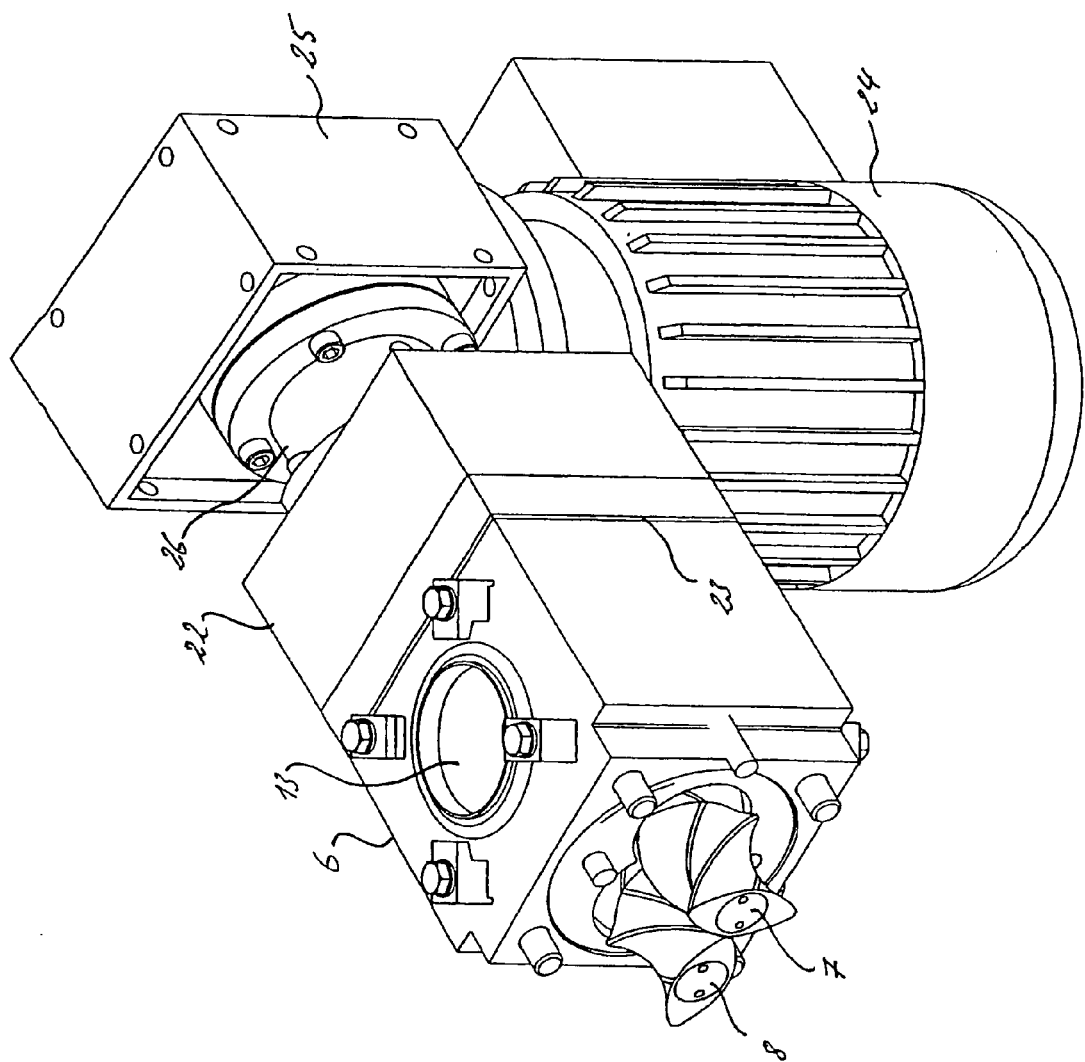
FIG. 5 the material retaining device removed from the process section.

To seal the process section vacuumtight, the intermediate housing 6 is flange-mounted vacuumtight laterally on the housing segment 1 according to FIGS. 1 and 5. Further, the intermediate housing 6 is connected vacuumtight to the split gear box 22. To reduce heat transfer from the hot intermediate housing 6 to the split gear box 22, a plate 23 made of thermal insulating material is disposed between opposing faces of the intermediate housing 6 and the split gear box 22.

The screw shafts 7, 8 of the material retaining device are driven by the electromotor 24 via a reduction gear 25. The housing 26 connecting the reduction gear 25 to the split gear box is, as apparent from FIGS. 2 to 4, penetrated only by a shaft 27, 28 which can be sealed vacuumtight with a magnetic clutch. While the shaft 27 is disposed coaxially to the shaft 8 in the embodiment according to FIGS. 2 and 4 with counterrotating shafts 7, 8, the shaft 28 in the embodiment according to FIG. 3 with corotating shafts 7, 8 is provided with a gear wheel 29 which meshes with the gear wheels 20, 21 on the shafts 7, 8.

The invention claimed is:

1. An extruder having a process section with a housing in which at least one processing screw shaft is disposed and which has at one end a material inlet opening for material to be processed, and at the other end a material outlet opening for processed material, and between the material inlet opening and the material outlet opening, an intermediate opening being provided in said housing for the escape of gas from the process section, said intermediate opening having connected thereto a material retaining device which has, in an intermediate housing, at least one backfeeding screw shaft extending from the intermediate opening to a gas outlet opening in the intermediate housing and conveying material penetrating into the intermediate housing back into the process section, characterized in that said backfeeding screw shaft is rotatably driven by a drive unit in a rotation direction during shaft rotation, and comprises opposite first and second shaft ends respectively defining a backfeeding first screw portion and a conveying second screw portion, said backfeeding first screw portion of the backfeeding screw shaft being provided in said intermediate housing so as to receive said material from said process section through said intermediate opening and facing the process section so as to have a backfeeding direction of thread backfeeding said material back into the process section from said first shaft end and through said intermediate opening during said shaft rotation, and said backfeeding screw shaft having said conveying second screw portion connected to said first screw portion and facing away from the process section which said second screw portion has an opposite conveying direction of thread so as to receive any of said materials penetrating past said first screw portion and conveying said materials away from said first screw portion and said process section toward said second shaft end during said shaft rotation.

2. The extruder according to claim 1, characterized in that the first screw portion with the backfeeding direction of thread is formed shorter than the second screw portion with the opposite conveying direction of thread.

3. The extruder according to claim 1, characterized in that the intermediate housing has an outlet opening for discharging solid products of decomposition at the end facing away from the process section, said solid products of decomposition being formed by said materials penetrating past said first screw portion.

4. The extruder according to claim 1, characterized in that the material retaining device has at least two intermeshing backfeeding screw shafts.

5. The extruder according to claim 4, characterized in that the intermeshing backfeeding screw shafts are counterrotatable.

6. The extruder according to claim 1, characterized in that the drive of the at least one backfeeding screw shaft is formed in one piece with the backfeeding screw shaft.

7. The extruder according to claim 6, characterized in that the drive is formed by a drive gear.

8. The extruder according to claim 6, characterized in that the drive is disposed in a split gear box, and heat insulating means are provided between the split gear box and the intermediate housing of the material retaining device.

9. The extruder according to claim 1, characterized in that an annular space is formed between the housing of the process section and an inside core extending axially therein, said space having a plurality of said processing screw shafts which are axially parallel and extending therein so as to be disposed along a circle at equal central-angle distance, each of which carries a number of tandem-arranged screw and processing elements with which adjacent shafts closely intermesh, the inside core on the interior side of said space and the inside wall of the housing being provided with channel-shaped axially parallel depressions in which the particular shaft with its processing elements is received and guided.

10. The extruder according to claim 1, characterized in that said first screw portion has opposite first and second ends, wherein said first end receives said material from said process section through said intermediate opening, and said second end is fixed to said second screw portion wherein said first and second screw portions rotate together in a common direction.

11. The extruder according to claim 10, characterized in that said first end of said first screw portion is disposed adjacent to said intermediate opening.

12. An extruder comprising a process section with a housing in which at least one processing screw shaft is disposed and which has at one end a material inlet opening for material to be processed, and at the other end a material outlet opening for processed material, and between the material inlet opening and the material outlet opening, an intermediate opening being provided in said housing for the escape of gas from the process section, said intermediate opening having connected thereto a material retaining device which has an intermediate housing receiving said process material from said process section and at least one backfeeding screw shaft extending from the intermediate opening to a gas outlet opening in the intermediate housing for the escape of gas from said process material, said material retaining device including a drive unit rotating said backfeeding screw shaft in a rotation direction during shaft rotation, and said backfeeding screw shaft having first and second shaft ends wherein said first shaft end is disposed proximate to said intermediate opening for receiving and conveying any said process material penetrating into the intermediate housing back into the process section, said backfeeding screw shaft having a backfeeding first screw portion at said first shaft end so as to receive said material from said process section through said intermediate opening, said first screw portion facing the process section so as to have a backfeeding direction of thread which backfeeds said process material back during shaft rotation into the process section through said intermediate opening, and said backfeeding screw shaft having a conveying second screw portion connected to said first screw portion away from said first shaft end and extending to said second shaft end, said second screw portion facing away from the process section and having an opposite conveying direction of thread so as to receive any of said process materials penetrating past said first screw portion and convey said process materials away from said first screw portion and said process section toward said second shaft end during shaft rotation, said backfeeding screw shaft being rotatable in said rotation direction by said drive unit and said first and second screw portions extending respectively to said first and second shaft ends such that any said process materials disposed about said first and second screw portions are respectively conveyed in said opposite backfeeding and conveying directions during shaft rotation.

13. The extruder according to claim 12, wherein the intermediate housing has an outlet opening for discharging solid products of decomposition at the second shaft end facing away from the process section, said solid products of decomposition being formed in said intermediate housing by said process materials penetrating past said first screw portion.

14. The extruder according to claim 12, wherein said first shaft end is positioned adjacent to said intermediate opening and receives said process material from said process section through said intermediate opening, said first and second screw portions are fixed coaxially so as to rotate together in a common direction.

* * * * *